United States Patent [19]
Rosin

[11] 3,792,833
[45] Feb. 19, 1974

[54] BOOST TERMINATION VALVE

[75] Inventor: Alexander D. Rosin, Pontiac, Mich.

[73] Assignee: The United States of America as represented by the Secretary of the Army, Washington, D.C.

[22] Filed: Aug. 14, 1972

[21] Appl. No.: 280,285

[52] U.S. Cl.............. 251/11, 251/63.4, 251/228, 251/297
[51] Int. Cl....................... F16k 1/20, F16k 31/163
[58] Field of Search...... 251/62, 63.4, 76, 228, 298, 251/299, 303, 11

[56] References Cited
UNITED STATES PATENTS

| 3,587,601 | 6/1971 | Shippy | 137/67 |
| 257,449 | 5/1882 | Pratt | 251/303 X |
| 3,006,596 | 10/1961 | Nelson | 251/228 X |

FOREIGN PATENTS OR APPLICATIONS

| 605,157 | 11/1934 | Germany | 251/228 |

Primary Examiner—Alan Cohan
Assistant Examiner—Richard Gerard
Attorney, Agent, or Firm—Edward J. Kelly; Herbert Berl; Herbert H. Murray

[57] ABSTRACT

A boost termination valve for use in the oxidizer line of a hypergolic rocket motor comprising a flapper valve normally latched in open position to permit flow of oxidizer therethrough, and a pyrotechnic device for releasing the latch and urging the flapper toward its closed position to terminate the flow of oxidizer to the engine.

4 Claims, 2 Drawing Figures

BOOST TERMINATION VALVE

BACKGROUND OF THE INVENTION

In a rocket having a hypergolic boost engine it is desirable to terminate the boost when the rocket reaches a predetermined velocity. Since the hypergolic fuel ignites automatically when mixed with the oxidizer one method of terminating the boost is to cut off the flow of either the fuel or the oxidizer.

It is therefore an object of this invention to provide a valve to cut off the flow of oxidizer to a hypergolic engine.

Another object of the invention is to provide a cut off valve which is quick acting.

Another object is to provide a valve which is operated by firing a pyrotechnic squib.

DETAILED DESCRIPTION OF THE INVENTION

Figure 1:
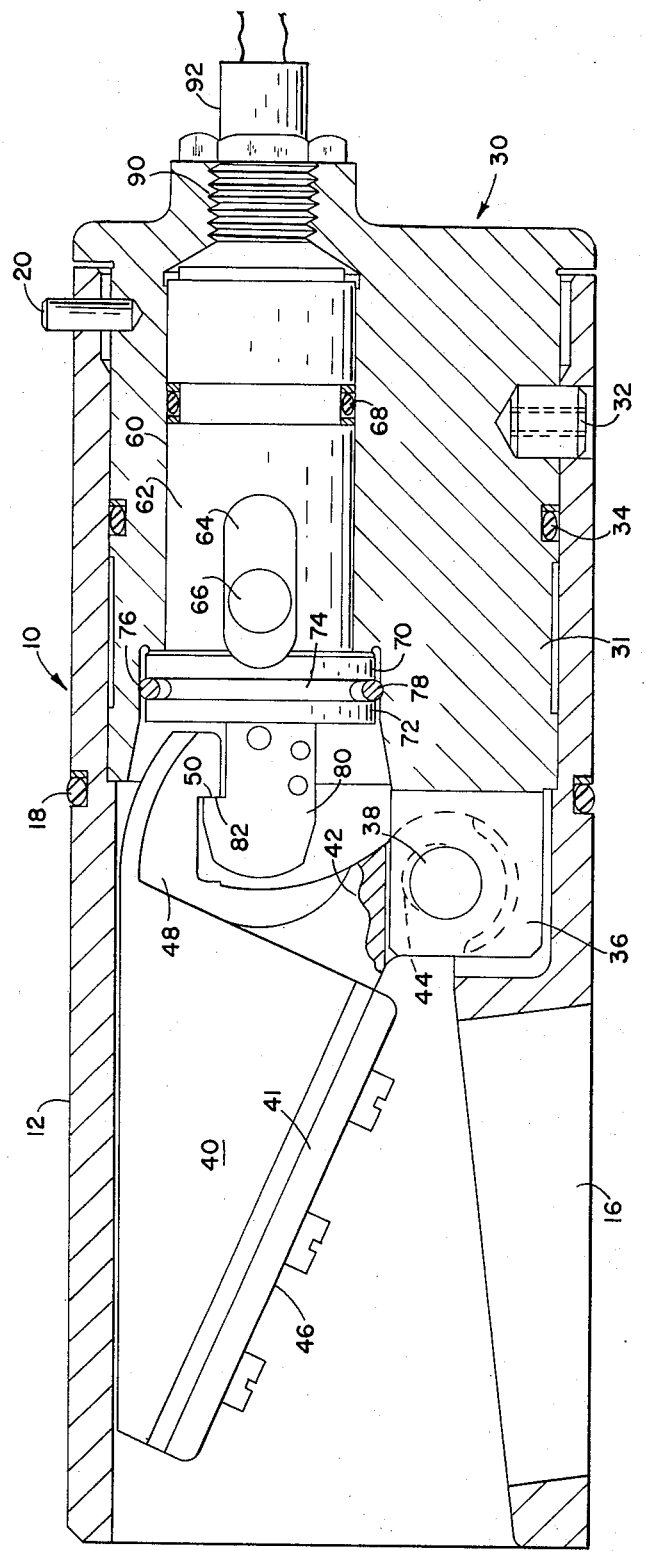
FIG. 1 is a partial longitudinal section of the valve of the present invention showing the flapper latched in its open position.
Figure 2:
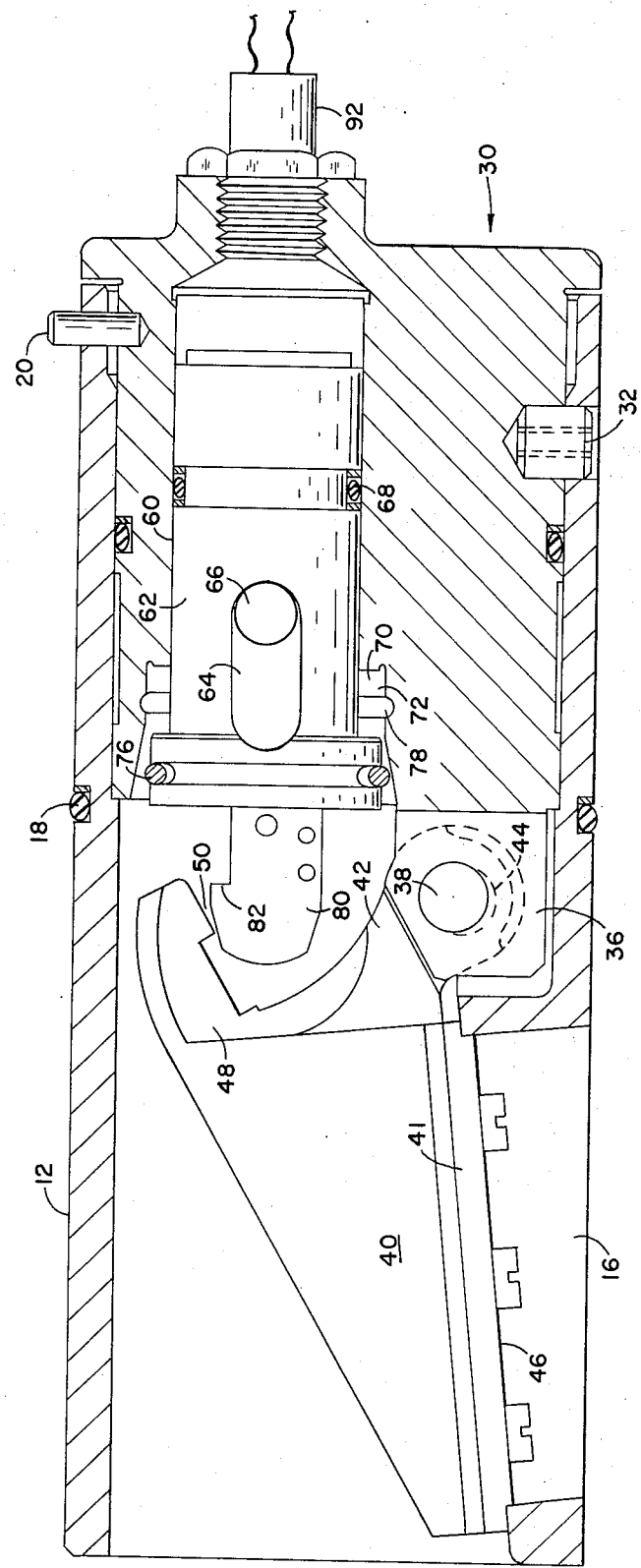
FIG. 2 is a similar section illustrating the valve in closed position.

The valve 10 of the present invention has a cylindrical housing 12 having an axial inlet port and a radial outlet port 16. The housing 12 is adapted to slip into a recess in the rocket engine (not shown) and be sealed by an O-ring 18 and positioned by an indexing pin 20.

A valve assembly generally indicated 30 is formed by a body 31 positioned within the sleeve 12 by an indexing pin 32 and sealed by an O-ring 34. The end of the body 31 toward the inlet and outlet ports 14 and 16 is provided with two forwardly extending ears one of which is illustrated at 36. A pin 38 is fixed within the ears 36.

A flapper assembly 40 faced with deformable material 41 and having a rearwardly projecting leg 42 is mounted for pivotal movement on the pin 38 which extends through a hole 44 provided in the leg 42. The hole 44 is slightly elongated in a direction normal to the face 46 of the flapper 40 for reasons set forth hereinbelow.

The upper portion of the projection 42 is formed in the shape of a hook as illustrated at 48 having a forwardly facing surface 50.

The body 31 is bored as illustrated at 60 and a piston 62 is slideably mounted within the bore. The piston 62 is provided with a transverse slot 64 and a pin 66 extends through the slot to limit the travel of the piston 62. An O-ring 68 provides a seal between the piston 62 and the wall of the bore 60.

The forward end 70 of the piston 62 is enlarged and slides within a counterbore 72 in the body 31. The enlarged end 70 of the piston 62 is provided with an angular groove 74. A compressable snap lock ring 76 is mounted in the groove 74 and projects outwardly into an annular depression 78 formed in the wall of the counterbore 72 to retain the piston 62 in the position illustrated in FIG. 1.

A hook shaped projection 80 is fixed to the forward end of the piston 62 and is provided with a rearwardly facing surface 82 which engages the previously described surface 50 on the flapper 40 to latch the flapper in open position as illustrated in FIG. 1.

The rear of body 31 is bored and tapped as illustrated at 90 co-axial with the bore 60. A pyrotechnic squib 92 is threaded into the opening 90.

In the use of the valve of the present invention, the assembly 10 is inserted into an opening provided in the rocket motor (not shown). The oxidizer for the motor flows through the valve entering through the inlet port and exiting through port 16. The valve is in the latched open position illustrated in FIG. 1.

When the missile reaches the desired velocity the squib 92 is fired. Gases from the squib force the piston 62 to the left overcoming the resistance of the lock ring 76. When the piston 62 moves to the left the latching face 82 on projection 80 disengages from the latch face 50 on the projecting portion 42 of the flapper 40. Continued movement of the piston 62 causes the forward face of projection 80 to strike the rear face of projection 42 thus rotating the flapper 40 about the pivot pin 38. When the flapper 40 rotates far enough for the fluid flow to strike the back side of flapper 40, the flapper slams shut against the port 16 closing said port to further flow. Prior to complete closure of flapper 40 the motion of piston 62 is arrested by the action of the pin 66 in slot 64.

The deformable material 41 on the face 46 of flapper 40, together with the looseness caused by the elongated hole 44, insures complete closure of port 16.

I claim:

1. A valve mechanism comprising:
   a housing having an inlet and an outlet,
   a hinged flapper for closing the outlet of said housing,
   latch means for releasably maintaining said flapper in open position,
   a piston and cylinder assembly,
   an actuator arm attached to the end of said piston adjacent said flapper and positioned to release said latch means and close said flapper upon movement of said arm toward said flapper,
   said piston having an elongated longitudinal slot therein,
   a pin fixed to said housing and extending transversely through said slot to limit the motion of said piston to a position less than that required to completely close said flapper, and
   means for driving said piston and actuator arm toward said hinged flapper thereby rotating said flapper toward a position closing said housing outlet.

2. A valve mechanism as set forth in claim 1, wherein:
   said latch means comprises interengaging hook portions on said flapper and said actuator arm to maintain said flapper in open position until said actuator arm moves toward said flapper.

3. A valve mechanism as set forth in claim 1, wherein:
   the hinge for said flapper comprises a pin fixed to said housing,
   an elongated hole in said flapper through which said pin extends, said hole being elongated in a direction normal to the face of said flapper to permit self centering action of said flapper when moved to closed position.

4. A valve mechanism as set forth in claim 3 wherein: a layer of deformable material is mounted on the face of said flapper which engages said outlet.

* * * * *